United States Patent

[11] 3,583,238

[72] Inventor Don A. Haynes
 Okemos, Mich.
[21] Appl. No. 801,600
[22] Filed Feb. 24, 1969
[45] Patented June 8, 1971
[73] Assignee FMC Corporation
 San Jose, Calif.

[54] MECHANISM AND METHOD FOR MOUNTING WHEEL ON TESTING APPARATUS
6 Claims, 5 Drawing Figs.
[52] U.S. Cl. .................................................. 73/487,
 144/288.1
[51] Int. Cl. .................................................. G01m 1/02
[50] Field of Search ........................................... 73/487;
 144/288.1

[56] References Cited
UNITED STATES PATENTS
2,136,633 11/1938 Morse ............................. 73/482
2,759,508 8/1956 Tobey ............................. 144/288
2,873,777 2/1959 Thostenson ..................... 144/288
3,474,840 10/1969 Scott ............................... 144/288

FOREIGN PATENTS
687,779 3/1953 Great Britain ................... 73/487

Primary Examiner—James J. Gill
Assistant Examiner—Herbert Goldstein
Attorneys—F. W. Anderson and C. E. Tripp ABSTRACT: Mechanism for mounting a wheel on a wheel balancer having a horizontal spindle with an abutment thereon is disclosed. A mounting plate, which has a plurality of sets of mounting holes, is placed on the vertical shaft of an auxiliary stand. The wheel is laid on the mounting plate and rotated thereon until the holes in the wheel are aligned with the proper set of holes on the mounting plate. Separate plugs having elastic O-rings are inserted in the holes of the wheel, the O-rings frictionally engaging the mounting plate. The assembled unit of mounting plate and wheel is transferred to the horizontal spindle of the wheel balancer. A backing plate is mounted on the spindle to engage the plugs, and a nut on the spindle forces the plugs into the wheel to urge the wheel against the mounting plate.

PATENTED JUN 8 1971
3,583,238
SHEET 1 OF 2
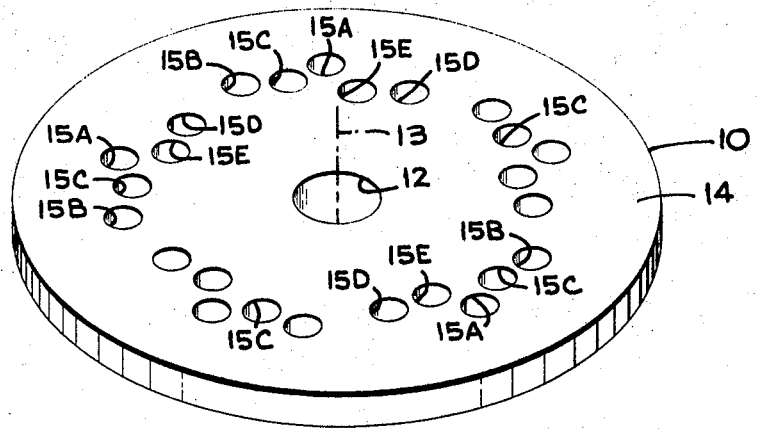
FIG_1
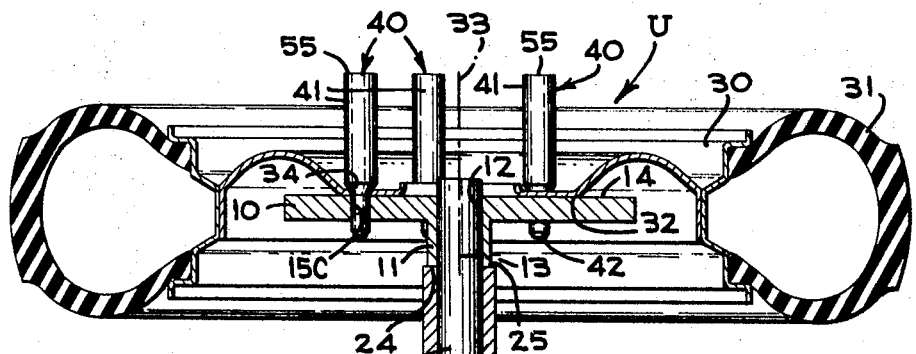
FIG_2
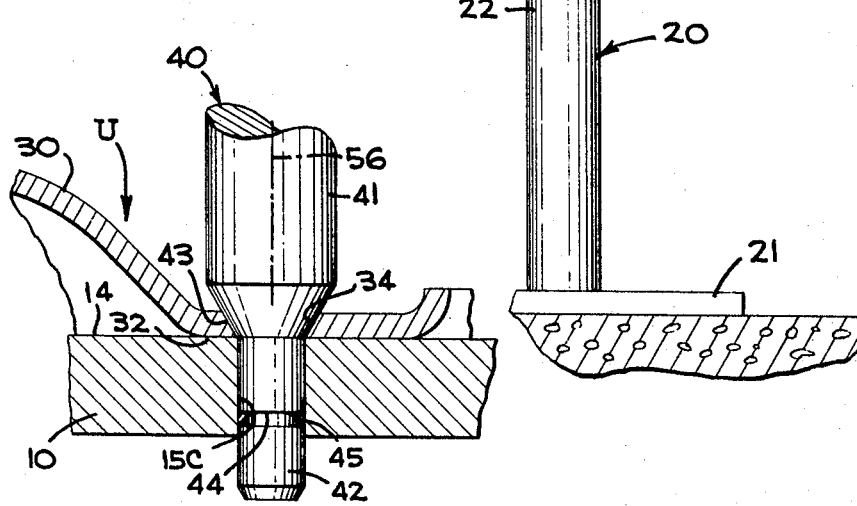
FIG_3
INVENTOR.
DON A. HAYNES
BY F.W. Anderson
C. C. Tripp
ATTORNEYS

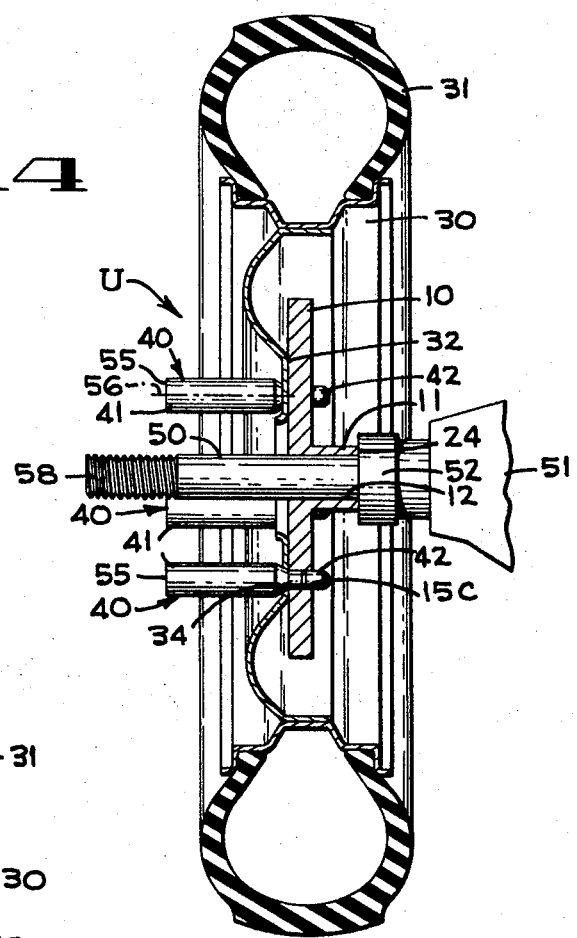
FIG_4
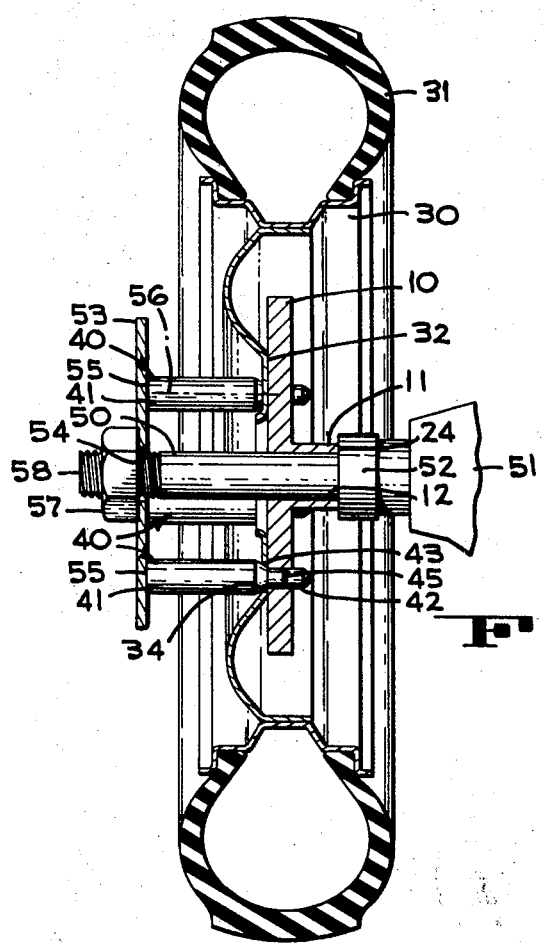
FIG_5

MECHANISM AND METHOD FOR MOUNTING WHEEL ON TESTING APPARATUS

BACKGROUND OF THE INVENTION

When testing a wheel on testing apparatus, such as on a wheel balancer, it is important that the wheel, which is mounted on the spindle of the wheel balancer, be normal to the axis of the spindle and be centered with respect to the spindle. It is customary to provide a mounting plate, which is centered with respect to the axis of the wheel balancer spindle, to facilitate proper positioning of the wheel on the spindle. The wheel is usually held against the front face of the mounting plate, which face is normal to the central axis of the spindle, and the wheel is secured against said face in centered relation to the mounting plate. With a conventional wheel balancer, the operator must hold the wheel against the mounting plate in centered relation thereto until the wheel is secured to the mounting plate.

SUMMARY OF THE INVENTION

In the preferred form of the present invention, the mounting plate has a hub which is machined to fit snugly on the spindle of a wheel balancer. Several sets of mounting holes are provided in the mounting plate, the holes of each set positioned for a particular size wheel. Initially, the mounting plate is placed over the vertical shaft of an auxiliary stand and is held thereon in a horizontal plane by an abutment. The wheel is then placed on the mounting plate and rotated thereon until the mounting holes in the wheel are aligned with the appropriate mounting holes in the mounting plate. Since the wheel is lying in a horizontal plane and resting on the mounting plate, the operator need not hold the wheel in position. At this time, plugs having rubber O-rings mounted on the shank are inserted into the aligned holes of the wheel and mounting plate. The O-rings establish frictional contact with the bore of the mounting plate, and the plugs hold the wheel to the mounting plate. As thus joined together, the assembly of wheel and mounting plate is lifted as a unit off the vertical shaft of the auxiliary stand and placed on the horizontal spindle of the wheel balancer. A backing plate, having a central opening, is then placed on the spindle. A nut placed on the spindle of the wheel balancer forces the backing plate against the heads of the plugs. Conical shoulders on the plugs center the wheel with respect to the mounting plate and urge the wheel tightly against the mounting plate.

It will be noted that the mounting plate, which is carefully machined, alone determines both the radial position of the wheel and the plane in which the wheel lies. This is because the plugs which are independent of each other, hold the wheel in the radial position determined solely by the accurately machined holes in the mounting plate. Since the wheel is held up against the precision mounting plate, which has a front face normal to the axis of the mounting plate hub, the wheel will be normal to the spindle on which the mounting plate hub is received. The wheel can thus be mounted on the wheel balancer spindle quickly, and accurately, without tiring physical effort.

It is therefore one object of the present invention to provide an improved method, and mechanism, for mounting a wheel on testing apparatus quickly, accurately, and with minimum effort. It is another object of the present invention to provide a method in which the wheel and mounting plate are preassembled for quick and easy mounting on the wheel balancer spindle, and to provide apparatus therefor. It is yet another object to provide a method of mounting a wheel on testing apparatus, and mechanism therefor, in which plugs with friction portions hold the wheel and mounting plate in assembled relation.

BRIEF DESCRIPTION OF THE DRAWINGS

FIG. 1 is a view in perspective of the front face of the mounting plate;

FIG. 2 is a side view, partly in cross section, of a wheel and the mounting plate mounted on an auxiliary stand;

FIG. 3 is an enlarged view of a plug joining the wheel and mounting plate;

FIG. 4 is a view of the wheel and mounting plate on the spindle of testing apparatus; and FIG. 5 is a view similar to FIG. 4 but with the backing plate mounted on the spindle.

DESCRIPTION OF THE PREFERRED EMBODIMENT

There is shown in FIGS. 1 and 2 a mounting plate 10 having a central hub 11. The hub and plate have a central bore 12 with a central longitudinal axis 13. The flat front face 14 of the mounting plate is normal to the axis 13, and a plurality of sets of holes 15A, 15B, 15C, 15D, 15E extend through the mounting plate parallel to axis 13. Each set of holes corresponds to a set of mounting holes on a particular size automobile wheel and, therefore, the mounting plate can be used with five different size wheels.

An auxiliary stand 20 has a base 21 and an upright hollow standard 22 from which a vertical shaft 23 extends. The mounting plate 10 is placed over shaft 23 with the bottom, or outer end, 24 of hub 11 resting on the abutment 25 defined by the upper end of standard 22. When the mounting plate 10 is on the auxiliary stand, the front, or upper face 14 of the mounting plate is horizontal.

An automobile wheel 30 has a tire 31 mounted thereon. The wheel has a flat, annular surface 32, which is normal to the central axis 33 of the wheel. The wheel surface 32 has a set of five conically countersunk mounting holes 34 angularly spaced, and spaced from the central axis 33, an amount corresponding to the angular spacing, and the spacing from the central axis, of one of the sets of mounting holes on the mounting plate, say, for example, the holes of set 15C. The surface 32 is the mounting surface of the wheel which engages the brake drum when the wheel is attached to the drum and mounted on a car.

The surface 32 of the wheel 30 is laid on the top surface 14 of the mounting plate by the operator, and the wheel is rotated to bring the holes 34 into alignment with the set of holes 15C in the mounting plate. It will be noted that since the wheel is horizontal, and is resting on a horizontal surface, the operator does not have to sustain the weight of the wheel as he aligns the holes therein with the holes in the mounting plate.

After the holes 34 in the wheel are aligned with holes 15C in the mounting plate, the operator inserts plugs 40 therein. The plugs 40, which are unconnected, each have a head, or handle 41, a shank 42, and a conical shoulder 43 between the head and shank. The shank 42 of each plug has an annular groove 44 in which a flexible, rubber, O-ring 45 is received. As shown in FIG. 3, the conical shoulders 43 seat in the countersunk holes 34 of the wheel, and the O-rings 45 are in the bores of the set of holes 15C. Thus, the wheel and mounting plate are held together by the plugs by virtue of the frictional engagement of the frictional members, the O-rings, in the bores of holes 15C, and by engagement of the plug shoulders 43 with the wheel 30.

The operator lifts the assembled unit U of wheel and mounting plate off the auxiliary stand and turns the wheel into a vertical plane for insertion on the horizontal spindle 50 of a wheel balancer 51. When the unit assembly of wheel and mounting plate is placed on the balancer spindle, the bottom, or outer, end 24 of the mounting plate hub abuts against a collar 52 which defines an abutment on the shaft. A backing plate 53, having a central opening 54, is placed over the balancer spindle and in engagement with the flat outer end surfaces 55 of the heads 41 of the plugs. End surfaces 55 are normal to the central longitudinal axes 56 of the plugs. A nut 57 is received on the outer end of the spindle, which is threaded as indicated at 58, and the nut is tightened against the backing plate to urge the backing plate against the heads of the plugs. The conical shoulders 43 of the plugs, which engage the countersunk holes 34 of the wheel, center the wheel with respect to the axis 13 of the mounting plate since the shanks of the plugs are snugly received in the bores 15C of the mounting plate. Thus, the central axis 33 of the wheel coincides with the central axis 13 of the mounting plate. At the same time, the flat annular surface 32 of the wheel is pressed against the face 14 of the mounting plate to be held in a vertical plane. It will be noted that the wheel, which is sandwiched tightly between the plugs and the mounting plate, will be held firmly therebetween.

Although the best mode contemplated for carrying out the present invention has been herein shown and described, it will be apparent that modification and variation may be made without departing from what is regarded to be the subject matter of the invention.

What I claim is:

1. Apparatus for mounting a wheel on the spindle of testing apparatus, said wheel having mounting holes, the combination comprising a mounting plate received on the spindle, said mounting plate having mounting holes to match the mounting holes on the wheel, a plurality of loose separate unthreaded plugs inserted in said mounting holes in the wheel and mounting plate to join the wheel to the mounting plate, and a member mounted on the spindle outside the wheel to engage the plugs and force the plugs into the wheel and thereby force the mounting plate into abutment against a cooperating member on the spindle.

2. Apparatus for mounting a wheel on the spindle of testing apparatus, said wheel having mounting holes and said spindle having an abutment thereon, the combination comprising a mounting plate having a flat front face and having a central hub on an axis perpendicular to said face, said central hub having a bore to define a close fit with the spindle, said mounting plate having a plurality of sets of mounting holes to accommodate wheels of different size including said wheel, a plurality of loose separate unthreaded plugs each having an annular groove and each having a flexible O-ring in the groove, said plugs received in the mounting holes of the mounting plate with the O-ring frictionally holding the plugs in the hole, a backing plate mounted on the spindle outside the wheel to engage the plugs, and a nut threadedly received on the spindle to force the plugs into the wheel and urge the wheel against the mounting plate.

3. The apparatus of claim 2 in which the wheels have conical countersunk mounting holes and in which the plugs have conical shoulders to engage the mounting holes and center the wheel with respect to the mounting plate.

4. The method of mounting a wheel member on the spindle of testing apparatus comprising the steps of joining with unthreaded plugs the wheel member in centered relation to a mounting plate member off the testing apparatus, transporting the joined wheel member and mounting plate member to the testing apparatus, mounting the assembly of said members on the spindle of the testing apparatus, and moving a backing member against the plugs thereby forcing the unthreaded plugs tightly into the wheel in unison and thereby forcing the plate member into abutment against a cooperating member on the spindle.

5. The method of claim 4 in which the wheel and mounting plate are mounted on the vertical shaft of an auxiliary stand for joining.

6. The method of claim 4 in which the unthreaded plugs are urged in unison tightly into the wheel by means of a backing plate received on the spindle of the testing apparatus and engaged simultaneously with all of said plugs.